United States Patent [19]
Izawa et al.

[11] Patent Number: 5,665,324
[45] Date of Patent: Sep. 9, 1997

[54] RECOVERY OF VALUABLE SUBSTANCES

[75] Inventors: Teruyoshi Izawa, Kasugai; Kazunori Kudo, Mizunami; Yoshihiro Kani, Tajimi; Ken Araki, Hirakata; Tamotsu Kato, Hirakata; Takashi Furui, Hirakata, all of Japan

[73] Assignees: Taihei Chemical Industrial Co., Ltd.; C. Uyemura & Co., Ltd., both of Osaka, Japan

[21] Appl. No.: 502,671

[22] Filed: Jul. 14, 1995

[30] Foreign Application Priority Data

Jul. 27, 1994 [JP] Japan ................. 6-194866

[51] Int. Cl.$^6$ ................. C01B 25/32
[52] U.S. Cl. ................. 423/308; 423/140; 423/184; 423/199; 423/311
[58] Field of Search ................. 423/140, 184, 423/193, 308, 311, 199

[56] References Cited

U.S. PATENT DOCUMENTS

| | | | |
|---|---|---|---|
| 4,481,175 | 11/1984 | Iino et al. | 423/308 |
| 4,789,484 | 12/1988 | Ying et al. | 423/140 |

FOREIGN PATENT DOCUMENTS

| | | | |
|---|---|---|---|
| 248311 | 10/1990 | Japan | 423/311 |
| 1368572 | 1/1988 | U.S.S.R. | 423/311 |

*Primary Examiner*—Wayne Langel
*Attorney, Agent, or Firm*—Sughrue, Mion, Zinn, Macpeak & Seas

[57] ABSTRACT

Valuable substances are recovered from a spent electroless nickel plating solution containing a water-soluble nickel salt, organic complexing agent, hypophosphite, phosphite, and alkali metal ion by adding oxalic acid to the plating solution for causing a nickel ion to precipitate as nickel oxalate for removal and recovery; optionally adding a sulfide to the plating solution for causing a heavy metal ion to precipitate as a heavy metal sulfide for removal; adding a mineral acid and calcium oxide, calcium hydroxide, calcium carbonate, calcium sulfate, calcium chloride or a calcium salt of organic acid to the plating solution from which the nickel ion has been removed; firing solids of the solution in air for converting the alkali metal ion into an alkali metal salt of mineral acid, converting phosphorus into hydroxyapatite, and pyrolyzing off the organic material; and pouring a solid mixture of the alkali metal salt of mineral acid and hydroxyapatite into water for dissolving the alkali metal salt of mineral acid in water for separate recovery of hydroxyapatite and the alkali metal salt of mineral acid.

11 Claims, No Drawings

RECOVERY OF VALUABLE SUBSTANCES

FIELD OF THE INVENTION

This invention relates to a method for recovering valuable substances from a spent electroless nickel plating solution. It also relates to a method for preparing hydroxyapatite from a solution containing hypophosphite and/or phosphite.

BACKGROUND ART

Electroless or chemical nickel plating solution containing a hypophosphite salt as a reducing agent has been widely used for the surface treatment of electronic parts, precision parts, and plastic articles. As plating reaction proceeds, the hypophosphite used as a reducing agent is oxidized into a phosphite which accumulates in the plating solution. This plating solution becomes unusable when the concentration of phosphite exceeds a certain limit.

A number of methods have been proposed for the disposal of such spent electroless nickel plating solution containing a hypophosphite as a reducing agent. However, there is available no effective method for treating the spent plating solution in an industrially advantageous manner and recovering valuable substances from the solution for reuse.

SUMMARY OF THE INVENTION

Therefore, an object of the present invention is to provide a method for recovering valuable substances from a spent electroless nickel plating solution containing a hypophosphite as a reducing agent which ensures disposal of the spent plating solution in an economical manner without inducing secondary pollution, and recovery of valuable substances of relatively high purity in a simple, industrially advantageous manner using a relatively simple apparatus.

Another object of the present invention is to provide a method for preparing hydroxyapatite from a solution containing a hypophosphite or phosphite by treating the solution so as to convert phosphorus into hydroxyapatite.

We have developed a simple method for recovering valuable substances from a spent electroless nickel plating solution for reuse without discharging polluting substances out of the processing facility.

More particularly, spent electroless nickel plating solution typically contains amounts of a water-soluble nickel salt such as nickel sulfate, a complexing agent or organic material such as sodium citrate, a hypophosphite such as sodium hypophosphite, and a phosphite resulting from oxidation of the hypophosphite as well as amounts of alkali metal ions such as sodium ion originating from the complexing agent, hypophosphite and phosphite.

Searching for a valuable substance recovery method which is effectively applicable to such spent plating solution, we have found that valuable substances can be effectively recovered from a spent plating solution by adding oxalic acid to the plating solution for causing a nickel ion to precipitate as nickel oxalate for removal and recovery, adding a mineral acid, typically sulfuric acid and calcium oxide, calcium hydroxide, calcium carbonate, calcium sulfate, calcium chloride or a calcium salt of an organic acid to the plating solution from which the nickel ion has been removed, firing solids of the plating solution in air to convert the alkali metal ion into a water-soluble alkali metal salt of mineral acid, to fix the phosphorus value of the hypophosphite and phosphite as water-insoluble hydroxyapatite, and to decompose the organic material in solids into steam and carbon dioxide, and separately recovering hydroxyapatite and the alkali metal salt of mineral acid. All the thus separated and recovered nickel oxalate, hydroxyapatite and alkali metal salt of mineral acid are of sufficiently high purity to recycle for industrial reuse.

Advantageously, a sulfide is added to the plating solution from which the nickel ion has been removed for causing the nickel ion which would remain in a minute amount and a heavy metal ion such as Zn, Fe, Pb and Al ions which is often present in the plating solution in a minor amount to respectively precipitate as nickel sulfide and a heavy metal sulfide for removal. The plating solution from which the heavy metal ion has been removed is then subject to the step of adding a mineral acid and a calcium compound and the subsequent steps as mentioned above.

According to a first preferred embodiment of the invention, there is provided a method for recovering valuable substances from a spent electroless nickel plating solution containing a water-soluble nickel salt, an organic material blended as a complexing agent for the nickel salt, a hypophosphite, a phosphite resulting from oxidation of the hypophosphite, and a substantial amount of an alkali metal ion, the method comprising the steps of adding oxalic acid to the plating solution for causing a nickel ion in the plating solution to precipitate as nickel oxalate for removal and recovery; preferably adding a sulfide to the plating solution from which the nickel ion has been removed for causing a heavy metal ion in the plating solution to precipitate as a heavy metal sulfide for removal; adding a mineral acid and a calcium compound selected from the group consisting of calcium oxide, calcium hydroxide, calcium carbonate, calcium sulfate, calcium chloride, and a calcium salt of an organic acid to the plating solution from which the nickel ion has been removed; firing solids of the plating solution in air for converting the alkali metal ion into an alkali metal salt of the mineral acid, converting the phosphorus value of the hypophosphite and phosphite into hydroxyapatite, and removing the organic material through pyrolysis; and pouring a solid mixture of the alkali metal salt of mineral acid and the hydroxyapatite into water for dissolving the alkali metal salt of mineral acid in water for separately recovering the hydroxyapatite and the alkali metal salt of mineral acid.

According to a second preferred embodiment of the invention, there is provided a method for recovering valuable substances from a solution containing a hypophosphite and/or phosphite, preferably free of a heavy metal ion, the method comprising the steps of adding a calcium compound selected from the group consisting of calcium oxide, calcium hydroxide, calcium carbonate, calcium sulfate, calcium chloride, and a calcium salt of an organic acid to the solution; firing solids of the solution in air or oxygen for converting the hypophosphite and phosphite into hydroxyapatite; and recovering the hydroxyapatite.

BEST MODE FOR CARRYING OUT THE INVENTION

The spent electroless nickel plating solution to be treated according to the invention generally contains a water-soluble nickel salt such as nickel sulfate, a nickel complexing agent (organic material), for example, carboxylic acid and a salt thereof (typically sodium salt) such as sodium citrate and another organic acid and a salt thereof, a hypophosphite (typically sodium salt), and a phosphite (typically sodium salt). The solution contains noticeable amounts of the complexing agent, hypophosphite, phosphite, and an alkali metal ion originating from an alkali hydroxide or aqueous ammonia added for pH adjustment during use of an electroless nickel plating solution (typically sodium ion or ammonium ion, and sometimes potassium ion when a potassium salt or potassium hydroxide is added for pH adjustment).

The concentration of the above-mentioned components in the plating solution and the pH of the plating solution are not critical for the process of the invention to achieve effective recovery. However, since it is, of course, advantageous to add appropriate amounts of reagents in the process steps, the amounts of nickel ion, phosphorus value (hypophosphite and phosphite) and alkali metal ion and pH should be measured by proper analysis prior to the process.

According to the present invention, oxalic acid is first added to the spent plating solution for causing a nickel ion in the solution to precipitate as nickel oxalate. Oxalic acid is preferably added in an amount of about 1 to 1.5 mol, especially 1 to 1.3 mol per mol of nickel ion. In this step, the plating solution should preferably be at pH 1.5 to 3, especially pH 1.8 to 2.4. Then a mineral acid such as sulfuric acid is preferably added to the plating solution for adjusting the pH to fall within this range. Also preferably the plating solution to which oxalic acid has been added is heated at 70° C. or higher and maintained at the temperature for more than 3 hours to ensure that nickel ion reacts with oxalic acid to form nickel oxalate.

The resulting precipitate in the form of nickel oxalate dihydrate is removed by filtration, washed with water, and dried, obtaining a fine dry powder of nickel oxalate dihydrate which is suitable for reuse. Alternatively, the dry powder is calcined into a fine powder of nickel oxide which is ready for reuse as a nickel source.

Since oxalic acid is added to the plating solution to precipitate a nickel ion therein as nickel oxalate, no phosphorus is entrained in the precipitate. Then when metallic nickel is recovered from the precipitate, entrainment of phosphorus in the metal is avoided. The resulting metallic nickel is of great value.

The wash liquid is combined with the filtrate which proceeds to the next step.

Next a sulfide is preferably added to the plating solution from which the nickel ion has been removed, for causing the nickel ion which is left in a minute amount and heavy metal ions such as Zn, Fe, Pb and Al ions which are present in minor amounts to precipitate as heavy metal sulfides for removal. This step is effective for avoiding contamination of the subsequently recovered valuable substances, typically hydroxyapatite, with such heavy metals and thus allowing the valuable substances to be recovered in a pure form. For example, the subsequently recovered hydroxyapatite contains about 150 ppm of nickel value absent the sulfide treatment whereas the sulfide treatment can reduce the amount of nickel in the hydroxyapatite to less than about 10 ppm.

Examples of the sulfide used herein include alkali sulfides such as sodium sulfide and potassium sulfide and ammonium sulfide. Various well-known organic sulfides are also useful for the treatment of heavy metals. Examples of the organic sulfide include thioamides such as thiourea, diphenylthiourea, and ortho-tolylthiourea, dithionates such as sodium dimethyldithiocarbamate and sodium diethyldithiocarbamate, thiazoles such as mercaptobenzothiazole, benzothiazole disulfide, and N,N-diethylthiocarbamoyl-2-mercaptobenzothiazole, and thiuram compounds such as tetramethylthiuram monosulfide, tetramethylthiuram disulfide, and dipentamethylenethiuram tetrasulfide. Sulfur-containing chelate resins are also useful.

For the sulfide treatment, the pH of the solution may be properly selected in accordance with a particular sulfide used. Usually the sulfide treatment is done in a weakly acidic or neutral or weakly alkaline region of pH 6 to 10, especially pH 7 to 9. Since the plating solution at the end of oxalic acid treatment is at pH 1.5 to 3, a caustic alkali such as sodium hydroxide may be added to adjust the pH to the desired range. The sulfide treatment in a weakly acidic to weakly alkaline region allows the subsequent concentration of the plating solution to which a mineral acid and a calcium compound are added to be performed in the same weakly acidic to weakly alkaline region, leading to many advantages including ease and safety of operation, a concentrating equipment which need not necessarily be highly resistant to corrosion (or acid), and a reduction of plant installation cost.

Preferably the sulfide is added in an amount of about 1 to 2 mol, especially about 1 to 1.5 mol per mol of the residual nickel ion. The heavy metal sulfide precipitate is removed by conventional separation means such as filtration. The thus separated and removed heavy metal sulfide sludge is treated in a conventional manner and discarded.

The wash liquid is combined with the filtrate which proceeds to the next step.

To the plating solution from which the nickel ion has been removed and which has been optionally subjected to sulfide treatment, a mineral acid and a calcium compound are then added. The mineral acid used herein includes sulfuric acid and hydrochloric acid. It is preferred to use the same type of mineral acid as the mineral acid ion mainly contained in the original electroless nickel plating solution. For example, where nickel sulfate is used as a nickel ion source, it is preferred to use sulfuric acid. Examples of the calcium compound added herein include calcium oxide, calcium hydroxide, calcium carbonate, calcium sulfate, calcium chloride, and calcium salts of organic acids. Among these, calcium oxide, calcium hydroxide, calcium carbonate, and calcium salts of organic acids may be used in any situation. Calcium sulfate should preferably be used where the mineral acid ion in the plating solution is a sulfate ion and calcium chloride should preferably be used where the mineral acid ion in the plating solution is a chloride ion.

The mineral acid is added in an amount necessary to convert the entire alkali metal ion in the plating solution to an alkali metal salt of mineral acid. Where calcium sulfate or calcium chloride is used as the calcium compound, the combined amount of the resultant sulfate or chloride ion and mineral acid may be sufficient to convert the entire alkali metal ion to an alkali metal salt of mineral acid. Where a mineral acid ion is previously contained in the plating solution, the amount of this mineral acid ion is also included in the combined amount.

For example, where sulfuric acid is used, the total amount of sulfate ion should preferably be about 0.3 to 0.7 mol, especially about 0.4 to 0.6 mol per mol of alkali metal ion.

The calcium compound is added in an amount necessary to convert the phosphorus value in the plating solution into hydroxyapatite. Preferably the calcium compound is added in an amount of about 1.5 to 2 mol, especially 1.6 to 1.8 mol per mol of phosphorus.

In the step of adding the mineral acid and calcium compound, the pH of the plating solution is not critical.

Next, the plating solution is evaporated to dryness, yielding solids containing phosphorus, alkali metal, mineral acid and organic material. Water removal by evaporation may be done in a conventional manner.

The solids are then fired in air. Preferably firing is done in a rotary kiln while feeding a sufficient amount of air.

Preferably the firing temperature is about 700° to 870° C., especially about 750° to 850° C. and the time is about 3 hours or longer, especially about 5 hours or longer.

Through this firing step, the low-oxygen acids, hypophosphorous acid and phosphorous acid in the plating solution are wholly oxidized to ortho-phosphoric acid which chemically reacts with the calcium salt which has been added in a stoichiometric amount, forming water-insoluble hydroxyapatite. The alkali metal value reacts with the mineral acid which has been added in a stoichiometric amount, forming a water-soluble alkali metal salt of mineral acid. The high-temperature firing in the presence of air also induces pyrolysis of the organic material into carbon dioxide and steam which escapes from the furnace.

The firing step yields a mixture of harmless and useful hydroxyapatite and the alkali metal salt of mineral acid, typically sodium sulfate.

Next, water is added to the mixture of hydroxyapatite and the alkali metal salt of mineral acid to dissolve the alkali metal salt of mineral acid in water. Hydroxyapatite is suspended in this aqueous solution of the alkali metal salt, resulting in an aqueous slurry. The amount of water added is preferably 3 to 6 times, especially 4.5 to 5.5 times the weight of the alkali metal salt of mineral acid. After addition of water, agitation is preferably continued at about 30° to 80° C., especially abut 40° to 60° C. for about 1 to 5 hours, especially about 2 to 3 hours.

By filtering the aqueous slurry, for example, hydroxyapatite is separated from the alkali metal salt of mineral acid. If desired, the procedure is repeated in order to leach the alkali metal salt of mineral acid out of the thus separated hydroxyapatite. The thus obtained hydroxyapatite is washed with water and dried by conventional heating into a powder, which may be used as an industrial chemical, animal feed and fertilizer.

On the other hand, the alkali metal salt of mineral acid is recovered by concentrating the filtrate in a conventional manner and evaporating it to dryness. The resulting alkali metal salt of mineral acid powder is reusable as an industrial chemical.

According to the present invention, a spent electroless nickel plating solution containing a hypophosphite as a reducing agent can be subject to closed disposal by simple operation without inducing secondary pollution. Valuable substances including nickel, phosphorus and alkali metal can be fixed at high purity and thus effectively separated and recovered for reuse. Only a relatively simple plant is required. Economical and industrially advantageous disposal of a spent plating solution is ensured.

EXAMPLE

Examples of the present invention are given below by way of illustration and not by way of limitation.

Example 1

The spent electroless nickel plating solution used herein had the following composition.

TABLE 1

| Component | Content (mol/l) |
|---|---|
| Nickel (as Ni) | 0.0873 |
| Hypophosphrous acid | 0.2781 |
| Phosphorous acid | 1.2356 |

TABLE 1-continued

| Component | Content (mol/l) |
|---|---|
| Sulfuric acid | 0.5770 |
| Sodium | 2.9234 |
| Organic acid (as three equivalent acid) | 0.1475 |
| pH | 4.78 |

Step 1

The spent electroless nickel plating solution, 1.0 liter, was accurately weighed and admitted into a glass beaker having an internal volume of 2 liters. To the beaker, 13.8 g of guaranteed reagent oxalic acid dihydrate and 44.5 g of 97.0% sulfuric acid were added to adjust to pH 2.10. With mild stirring, the solution was heated to 75° C. and maintained at the temperature for 5 hours.

The solution was cooled and the resulting precipitate was removed by filtration. The precipitate was washed with 100 ml of water and then dried at a temperature of 80° C. for 12 hours, recovering 15.9 g of nickel oxalate dihydrate.

By powder X-ray diffractometry, this was identified to be nickel oxalate dihydrate. By chemical analysis, it was determined 98.5% pure.

Step 2

The filtrate from which the nickel precipitate had been removed was combined with the wash liquid used to wash the precipitate. To the solution, 45.0 g of 97% sulfuric acid and 144.5 g of 98% calcium oxide were added. With a water bath, the solution was heated and evaporated to dryness, yielding 529 g of white solids.

The solids were placed in a rotary kiln having an internal volume of 3 liters. The kiln was slowly rotated, heated to an internal temperature of 780° C. and maintained at the temperature for 6 hours while flowing air. After the kiln was cooled, the contents were taken out, obtaining 460 g of a fired product.

By powder X-ray diffractometry, the fired product was identified to be a mixture of hydroxyapatite and sodium sulfate. By chemical analysis, it was determined to be a mixture consisting of 253 g of hydroxyapatite and 207 g of sodium sulfate.

Step 3

A 400-g portion of the fired product was weighed and combined with 900 g of water. With stirring, the mixture was heated to 50° C. After 2 hours of stirring, the suspension was passed through a filter. The insoluble (hydroxyapatite) on the filter was washed with three portions of 200 g of water at 50° C. The filtrate was combined with the wash liquid which proceeded to step 4 below.

The insoluble (hydroxyapatite) on the filter was further washed with 500 g of water at 50° C., obtaining 520 g of the wash liquid.

The insoluble (hydroxyapatite) on the filter was dried at 200° C., recovering 218 g of a powder (hydroxyapatite).

Upon powder X-ray diffractometry, the powder showed a diffraction pattern typical of hydroxyapatite. By chemical analysis, it was determined to be tricalcium phosphate of sufficient quality to use as feed and fertilizer.

Step 4

The combined liquid of the filtrate and the wash liquid which contained sodium sulfate in a high concentration was concentrated on a water bath and evaporated to dryness, recovering 169 g of a powder.

By powder X-ray diffractometry, the powder was identified to be anhydrous sodium sulfate. By chemical analysis, it was determined to be sodium sulfate of sufficient quality to use as an industrial reagent.

Example 2

At the end of step 1 of Example 1, the filtrate from which the nickel precipitate had been removed was combined with the wash liquid used to wash the precipitate. The liquid was adjusted to pH 8.0 with 25% caustic soda solution. To the liquid was added 0.318 g of sodium sulfide hydrate (solid). The liquid was heated to 85° C. and stirred for one hour at the temperature. A precipitate settled. It was removed by filtration, obtaining 0.08 g of a sulfide sludge.

The filtrate resulting from this sulfide treatment was subject to step 2 and so forth of Example 1.

The hydroxyapatite thus recovered contained 2 ppm of nickel although the hydroxyapatite recovered in Example 1 has a nickel content of 100 ppm. Example 3

The same homogeneous electroless plating solution as used in Example 1, 1.0 liter, was accurately weighed and subject to the same step 1 as in Example 1. The filtrate resulting from this nickel removal step was combined with the wash liquid. To the solution, 45.0 g of 97% sulfuric acid, 151.0 g of 99.5% calcium carbonate and 79.0 g of 96% calcium hydroxide were added. With a water bath, the solution was heated and evaporated to dryness, yielding 545 g of white solids.

The solids were placed in a rotary and fired as in step 3 of Example 1, obtaining 62 g of a fired product. By analysis, the fired product was determined to be a mixture consisting of 253 g of hydroxyapatite and 209 g of sodium sulfate.

A 400-g portion of the fired product was weighed and combined with 520 g of the wash liquid obtained in step 3 of Example 1 and 380 g of water. Drying at 800° C. yielded 217 g of hydroxyapatite powder. The combined liquid of the filtrate and the wash liquid which contained sodium sulfate in a high concentration was worked up as in step 4 of Example 1, recovering 176 g of sodium sulfate powder.

By powder X-ray diffractometry and chemical analysis, they were determined to be tricalcium phosphate of sufficient quality to use as feed and fertilizer and sodium sulfate of sufficient quality to use as an industrial reagent, respectively.

Example 4

The procedure of Example 3 was repeated except that the filtrate resulting from the nickel removal step was subject to sulfide treatment as in Example 2. The hydroxyapatite thus recovered contained 2 ppm of nickel.

We claim:

1. A method for producing hydroxyapatite, said method comprising the steps of:
   (a) adding oxalic acid to a spent electroless nickel plating solution to precipitate nickel oxalate therefrom, said spent plating solution comprising a water-soluble nickel salt, an organic material complexing agent for the nickel salt, a hypophosphite, a phosphite and an alkali metal ion;
   (b) separating the nickel oxalate precipitate from the solution obtained from step (a);
   (c) adding a mineral acid and a calcium compound to the solution obtained from step (b), wherein said calcium compound is selected from the group consisting of calcium oxide, calcium hydroxide, calcium carbonate, calcium sulfate, calcium chloride and a calcium salt of an organic acid;
   (d) evaporating water from the solution obtained from step (c) to obtain dry solids and firing said solids in air (1) to convert the alkali metal ion into an alkali metal salt of the mineral acid added in step (c), (2) to convert the phosphorus value of the spent solution of step (a) into hydroxyapatite and (3) to remove the organic material through pyrolysis, thereby forming a mixture of alkali metal salt and hydroxyapatite;
   (e) contacting the mixture of alkali metal salt and hydroxyapatite obtained from step (d) with water to form an aqueous solution of the alkali metal salt including undissolved hydroxyapatite; and
   (f) recovering the hydroxyapatite.

2. The method of claim 1, wherein said spent plating solution of step (a) further comprises a heavy metal ion other than a nickel ion, and wherein said method further comprises additional steps between steps (b) and (c), said additional steps comprising
   (g) adding a sulfide to the plating solution obtained from step (b) to precipitate heavy metal sulfide; and
   (h) separating heavy metal sulfide precipitate from the solution obtained from step (g), wherein said mineral acid and said calcium compound are added, according to step (c), to the solution obtained from step (h).

3. The method of claim 2, wherein said heavy metal ion is selected from the group consisting of Zn, Fe, Pb and Al.

4. The method of claim 1, wherein said plating solution after the precipitation step (b) comprises residual nickel ions, and wherein said method further comprises additional steps between steps (b) and (c), said additional steps comprising
   (i) adding a sulfide to the plating solution obtained from step (b) to precipitate nickel sulfide; and
   (j) separating nickel sulfide from the solution obtained from step (i); wherein said mineral acid and said calcium compound are added, according to step (c), to the solution obtained from step (j).

5. The method of claim 1, wherein the amount of calcium compound added in step (c) is sufficient to convert the phosphorus value in the solution to hydroxyapatite during the evaporation and firing step (d).

6. The method of claim 1, wherein the amount of calcium compound added in step (c) is from about 1.5 to 2 mol of calcium per mol of phosphorus.

7. The method of claim 1, wherein the amount of calcium compound added in step (c) is from 1.6 to 1.8 mol of calcium per mol of phosphorus.

8. The method of claim 1, wherein the amount of mineral acid compound added in step (c) is sufficient to convert the entire alkali metal content in the spent plating solution to an alkali metal salt of said mineral acid during the evaporation and firing step (d).

9. The method of claim 1, wherein the pH of the solution during step (a) is 1.5 to 3.

10. The method of claim 1, wherein the pH of the solution during step (a) is 1.8 to 2.4.

11. The method of claim 1, wherein the aqueous solution of the alkali metal salt, obtained from step (e), is recovered.

* * * * *